United States Patent [19]
Moser et al.

[11] Patent Number: 6,033,899
[45] Date of Patent: *Mar. 7, 2000

[54] COMPOST DECONTAMINATION OF SOIL CONTAMINATED WITH PCP USING AEROBIC AND ANAEROBIC MICROORGANISMS

[75] Inventors: Guy P. Moser, Guelph; Neil C. C. Gray, Oakville, both of Canada

[73] Assignee: Zenca, Inc., Wilmington, Del.

[*] Notice: This patent is subject to a terminal disclaimer.

[21] Appl. No.: 09/080,652

[22] Filed: May 18, 1998

Related U.S. Application Data

[63] Continuation-in-part of application No. 08/742,508, Nov. 1, 1996, Pat. No. 5,902,744.

[51] Int. Cl.[7] .............................. B09B 3/00; C07G 17/00; C12P 1/04; D06M 16/00
[52] U.S. Cl. ................................ 435/262.5; 71/11; 71/15; 71/21; 71/25; 71/903; 435/170; 435/264; 435/267; 435/822; 588/207
[58] Field of Search .................................... 71/15, 21, 25, 71/903, 11; 435/170, 262.5, 264, 267, 822; 588/207

[56] References Cited

U.S. PATENT DOCUMENTS

| | | | |
|---|---|---|---|
| 5,593,888 | 1/1997 | Glaze et al. | 435/262.5 |
| 5,660,612 | 8/1997 | Bernier et al. | 71/15 |
| 5,711,020 | 1/1998 | Wolfe et al. | 588/203 |
| 5,824,541 | 10/1998 | Horn et al. | 435/262.5 |

OTHER PUBLICATIONS

"Principles of Composting", Golucke; The Biograde Guide to the Art of Science of Composting; Journal of Waste Recycling; The JG Press, Inc, 1991, pp. 14–27.

"Microbiological Degradation of Pesticides in Yard Waste Composting", Fogarty et al, Microbiology Reviews, Jun. 1991, p 225–233.

"Disposal of Organic Hazardous Wastes by Composting", Savage et al., Bio Cycle Jan./Feb. 1985 pp 31–34.

"Anaerobic DDT Biodegradation: Enhancement by Application of Surfactants and Low Oxidation Reduction Potential", Applied and Environmental Microbiology, You et al., p 1–35, 1994.

"Anaerobic DDT Degradation of Contaminated Soil by Mixed Consorting and Enhancement by Surfactant Addition in Slurry Reactors", You et al., Water Environment Federation, Oct. 1994, p 635–645.

*Primary Examiner*—David M. Naff
*Assistant Examiner*—Deborah K. Ware
*Attorney, Agent, or Firm*—Robert J. Reichert

[57] ABSTRACT

A process of decontaminating soil containing pentachlorophenol (PCP) contaminant comprising admixing an organic nutrient material into soil in an amount of about 10% to 95% by weight of the soil mixture. The soil mixture forms a compost mixture. Composting the compost mixture at a temperature in the range of 20 to 65 degrees celsius. The water content of the compost mixture is maintained in a range of 40% to 100% water holding capacity (WHC). The redox potential level during the composting is below negative 200 mV to achieve partial degradation of the PCP contaminant. After composting, the compost mixture is oxygenated to raise the redox potential to positive 100 mV to further degrade the contaminant; and the steps are repeated until the PCP contaminant is present in an amount less than 140 ppm per ton of soil. The organic nutrient material comprises agricultural waste and municipal waste.

9 Claims, No Drawings

COMPOST DECONTAMINATION OF SOIL CONTAMINATED WITH PCP USING AEROBIC AND ANAEROBIC MICROORGANISMS

This application is a continuation-in-part of application Ser. No. 08/742,508 filed Nov. 1, 1996, now U.S. Pat. No. 5,902,744.

This invention relates to a controlled micro-organism degradation process for decontaminating soil or sediments contaminated with PCP (pentachlorophenol).

Numerous land sites exist that are contaminated and have been contaminated for decades, with the highly toxic contaminant PCP. Many of these sites are unusable and will remain unusable until some economical process becomes available for large scale decontamination of the soil of such sites.

BACKGROUND OF THE INVENTION

Prior art papers disclose laboratory experiments in microorganism biodegradation of toxic compounds, such as nitro-substituted DDT, by anaerobic treatment. Significant biodegradation of DDT occurred in these experiments, but toxic metabolites of DDT remained. Remediation, as hereinafter defined was not achieved by these prior art DDT techniques.

Recent U.S. Pat. Nos. 5,660,612 and 5,660,613 disclose the remediation of soil contaminated with DDT by a method comprising repeated cycles of anaerobic composting followed by aerobic composting under specific conditions of water content temperature, redox potential and the presence of microbes capable of transforming DDT into harmless materials.

We attempted to decontaminate soil containing various contaminants other than DDT. While this method has been found successful with a limited number of specific contaminants, it was unsuccessful for many contaminants, especially if one or more microbe inoculents are not added to the decontamination mixture. There was no reliable way to predict which compounds would be effectively decomposed by this method, and particularly no reason to expect that it would be successful in decontaminating soil containing no nitro-substituteded compounds. Conventional composting has also been tried, but anaerobic/aerobic sequence decontamination appears to be novel.

Experiments have been carried out biodegrading TNT by conventional anaerobic composting. As described in Crawford U.S. Pat. No. 5,455,173 experiments have been done to apply microbe degradation to soil contaminated with TNT and other explosives

SUMMARY OF THE INVENTION

The present invention provides a process of decontaminating soil and/or sediments containing PCP by converting the PCP contaminant into harmless materials thereby decontaminating the soil to whatever extent desired, either partial decontamination or complete remediation. The process comprises treating soil and/or sediment that contains populations of viable anaerobic and aerobic microbes capable of transforming the contaminants into harmless materials and being viable under both the anaerobic and aerobic conditions present during the present process.

The treatment comprises admixing the PCP contaminated soil with amendment material to form a solid compost mixture containing organic nutrient materials; composting the mixture while maintaining the temperature of the compost mixture in the range of about 20 to 65° C. and the water content of the compost mixture in the range of about 40% to 100% water holding capacity (WHC); during this composting maintaining the redox potential of the compost mixture below about negative 200 mV until a significant amount of the contaminant is degraded; and thereafter oxygenating the compost mixture to raise the redox potential level of the compost mixture above about positive 100 mV; and maintaining the redox potential level above positive 100 mV until a further significant amount of the contaminant is degraded. This sequence of stages of negative/positive redox potential levels can be repeated as often as necessary to yield soil or sediment containing little of the PCP contaminant, which has been converted to harmless materials.

DEFINITIONS

The term "composting" as used herein in describing the decontamination process of The Present Invention means transforming by degradation contaminant in the soil and/or sediment, namely PCP, to harmless materials utilizing biological activity, the process being carried out in the solid state with the addition of organic nutrient material.

"Amendment, "amendment material" and soil amendment material mean material comprising organic nutrients for the microbes that are to degrade the PCP contaminant in the soil to be decontaminated.

"Harmless materials" are materials that are unobjectionable in the concentrations present in soil or sediment for its intended use.

"Decontamination" means transforming the contaminants to harmless materials, including biodegrading the contaminants and/or binding the contaminants to soil or other material.

"PCP" means pentachlorophenol.

"Remediation" means decontamination to an unobjectionable level of the contaminants in the soil/sediment for the intended use of the soil/sediment.

"Soil" means earth, i.e. humus, sand and particulate rock, and includes sediment from above and beneath the surface of water.

DESCRIPTION OF THE INVENTION

In the process of the present invention, the soil to be decontaminated must contain appropriate types of microbes that are viable throughout the process and are capable of degrading the contaminants. These microbes must be viable under both the anaerobic and aerobic conditions to which they will be subjected during the present process. The microbes normally are bacteria, fungi, actinomycetes, and to a lesser extent protozoa. The microbes preferably are indigenous to the contaminated soil, that is, they are present in the soil to be decontaminated; or they are recycled from, or along with, soil already subjected to the present process. In some cases it may be beneficial, although not necessary to add an inoculant containing such viable microbes that degrade this contaminant. In some circumstances this speeds up the initial decontamination.

In the practice of the present invention a solid anaerobic compost mixture is prepared by mixing appropriate soil amendment into the soil to be decontaminated to give a total amount of such material of at least 10%, and up to about 95% by weight of the mixture, and preferably from about 30% to 70% by weight of amendment material, some of which may already be present in the soil. The soil amendment material comprises a conventional source of organic nutrient for composting. The preferred amendment nutrient materials are agricultural waste and municipal waste sludge, preferably a manure such as horse, cow, sheep, turkey, chicken or fish manure, or activated sludge. Alfalfa, hay, sawdust, peat grass and other bulking materials may originate in manure or be specifically added.

In some cases it may be desirable to add into the soil amendment a surfactant to render the contaminants more available to biological degradation. Suitable surfactants include polysorbates, octoxynols, anionic alkyl sulfates, anionic alkyl aryl sulfates and ethoxylates. Examples of suitable surfactants include "Tween" nonionic surfactants commercially available from ICI Americas, Inc., "Triton" nonionic surfactants commercially available from Union Carbide and "DAWN" detergent commercially available from Procter & Gamble. A suitable mixture of surfactants is "Triton" and "DAWN". The amendment material may also contain, or be supplemented with, liquid or solid organic or inorganic nutrients. Organic materials high in nitrates and phosphates are normally used.

The compost mixture is maintained in a moist but solid state. Throughout the process the moisture level is maintained at less than 100% of the mixture water holding capacity WHC, preferably in the range of about 40 to 70% WHC.

After mixing, biological degradation of organic matter in the mixture starts, raising the temperature and depleting the oxygen to an anaerobic condition. The temperature of the mixture is thereafter maintained within the range of about 20–65° C. This is easily done by controlled air movement through the compost mixture (e.g. through pipes) and/or by the addition of nutrient material. Below about 20° C., the biodegradation proceeds uneconomically slowly; above about 65° C. excessive microbe kill may take place. The preferred temperature range is within about 35–55° C. The anaerobic microbes in the compost mixture remain viable for the subsequent aerobic degredation steps and the anaerobic degradation microbes remain viable for any needed subsequent anaerobic degradation steps. Thus, it is essential that aerobic and anaerobic degradation microbes remain viable throughout the process of the present invention.

During the anaerobic step a low redox potential level is maintained in the compost mixture about negative 200 mV, and preferably in the range of negative 300 mV to 500 mV. This level has been found to be optimum for the anaerobic phase of the process. The redox potential level can be maintained within this range by moist air movement through the compost and/or by he addition of conventional reducing agents such as sulfite and acetate reducing compounds.

The first anaerobic step and subsequent anaerobic steps are continued until a significant amount of the contaminants is degraded in the step. This can be determined by analysis. Typically, in the first anaerobic step degradation of about 30% to 70% of the initial content of the contaminants is desirable.

After the contaminants content of the soil/manure mixture is decreased significantly in the first anaerobic stage, the mixture is oxygenated by any suitable means, preferably by air fed through and/or mixed with the mixture to achieve aerobic conditions. Sufficient oxygenation is applied for the redox potential level during the aerobic treatment to be maintained above about positive 100 mV. The aerobic conditions activate further degradation, yielding harmless materials. The aerobic degradation step is continued until a significant amount of the contaminants is degraded by the aerobic treatment.

In most cases, the desired degree of biodegradation of the contaminants for acceptable remediation will not be achieved in the first anaerobic/aerobic treatment sequence. In the highly preferred process, the sequences is repeated one or more times as needed for acceptable soil decontamination. Substantially complete remediation is achievable by this multi-sequence preferred process.

A desirable feature of this process is that the degrading microbes are maintained viable throughout the anaerobic/aerobic treatment cycles, so that it is not essential that microbes be supplemented before repeating the treatment cycle. However, it may be desirable to add more nutrient materials, manure, or other conventional fermentation ingredients, primarily to supplement the organic feed supply and to also introduce more bulking agent.

As aforementioned, maintaining the proper redox potential levels of the compost mixture in the anaerobic and aerobic steps is necessary for effective practice of the present process. The appropriate redox potential levels can be maintained by the addition of conventional nutrient materials and/or reducing agents such as sulfite and/or acetate compounds. Absolute anaerobic and aerobic conditions are needed (although short localized excursions can be expected). For the purpose of the present invention, a redox potential level of less than about negative 200 mV is considered anaerobic, and is required for the anaerobic steps; and a redox potential level greater than about positive 100 mV is considered aerobic and is required for the aerobic steps. During the anaerobic steps, the preferred redox potential level is in the range of about 300 to 500 mV; and during the aerobic steps it is in the range of about positive 200 to 300 mV. The redox potential level from about negative 200 mV to about positive 100 mV is considered anoxic. In the present invention, when going from anaerobic to aerobic conditions, and visa versa, anoxic conditions are present in the compost. During this period, degradation of some amounts of the contaminants appears to take place, but at low rates. Thus, speedy transition from one state to the other expedites overall degradation.

In the practice of the present invention, it may be desirable to have anaerobic conditions in some parts of these compost and at the same time aerobic conditions in other parts. This may be desirable because of different initial contaminant levels and/or degradation rates in different parts of he compost mixture. Thus, to approach uniform degradation, it may be necessary for some parts of the compost to remain longer in an anaerobic or an aerobic state.

During composting high microbe counts are present, preferably up to 10 to the eighth power aerobic culture forming units per grams as measured by standard plate count techniques (cfu), and up to 10 to the sixth power anaerobic cfu/g. These microbe counts of course include microbes other than those that degrade the contaminants.

In practice the present process is conducted in a compost container, normally in a container cell or windrow. The soil to be treated can be analyzed and composted in the laboratory to determine optimum conditions of amendment composition, and anaerobic/aerobic treatment times and number of sequences. Typically for soil contaminated with up to 20,000 ppm. of contaminants, 2 sequences of 4 weeks anaerobic composting followed by 2 weeks or aerobic treatment are adequate.

As described above, the present process involves an anaerobic composting stage followed by an anaerobic stage. However, it may be desirable to initially treat the soil anaerobically to lower the content of pre-existing undesirable materials prior to the first anaerobic stage.

The following examples are illustrative of the preferred practice of the present invention.

EXAMPLE

Wet soil contaminated with 57 mg/kg of PCP is mixed with 40% volume/volume (v/v) and 5% straw. 175 gram samples of this mixture, containing water at about 60–70% WHC, are mixed thoroughly with an anaerobic mixture of 5% hydrogen, 5% carbon dioxide and 9% nitrogen and then put into an air tight anaerobic chamber, capped tightly and incubated for 4 weeks at 45 degrees C. The soils are mixed weekly. During this anaerobic treatment e redox potential decreases rapidly and remains below negative 200 mV throughout the anaerobic treatment.

The samples are then uncapped and then thoroughly mixed twice weekly to aerate with atmospheric air at 80% relative humidity at 30 degrees C. for two weeks. The moisture level is maintained bat 60–70% WHC by manual addition of water and mixing.

During this aerobic treatment he redox potential rises and remains above positive 100 mV throughout the aerobic treatment. During the anaerobic/aerobic treatment the average sample container level is found to decrease to 16 ppm (72%), Repeated sequences of such anaerobic/aerobic treatment sequences will give further PCP reduction, even to remediation.

By following the procedure of this example, but by modifying the amounts and kind of additives added to the compost mixture, and the other process parameters within the above description, excellent decontamination of PCP is obtained.

What is claimed:

1. A process of decontaminating soil containing pentachlorophenol (PCP) contaminant and populations of viable anaerobic and aerobic microbes capable of transforming said contaminant into harmless material, said process comprising:

(a) admixing organic nutrient material for composting into said soil, in an amount of at least 10% and up to 95% by weight of the resultant mixture of said soil and said organic nutrient material to form a solid compost mixture;

(b) composting said compost mixture while maintaining the temperature of the compost mixture in the range of about 20 to 65 degrees celsius and maintaining water content of the compost mixture in the range of about 40% to 100% of water holding capacity of said compost mixture;

(c) during said composting maintaining the redox potential level of the mixture below about negative 200 mV until said contaminant is partially degraded; and (d) thereafter oxygenating the compost mixture to raise the redox potential level of the compost mixture to above about positive 100 mV, and maintaining the redox potential at above about positive 100 mV until said contaminant is further degraded;

(e) wherein the steps (a) to (d) are repeated until the amount of said contaminant is less than 140 ppm per ton of soil.

2. The process of claim 1 wherein the sequence of steps (b) through (d) are repeated.

3. The process of claim 1 wherein the compost mixture initially contains at least about 10% by weight of organic nutrient material.

4. The process of claim 1 wherein some organic nutrient material is present in the contaminated soil before said admixing in step (a).

5. The process of claim 1 wherein said organic nutrient material comprises one or more of agricultural waste and municipal waste.

6. The process of claim 1 wherein a surfactant is added to said compost mixture.

7. The process of claim 1 wherein said temperature is maintained in the range of about 30° C. to 55° C.

8. The process of claim 1 wherein said organic nutrient material is initially in a range of 30–70% by weight of said resultant mixture.

9. The process of claim 1 wherein when said redox potential level is below negative 200 mV the redox potential is maintained in the range of about negative 300 to 500 mV, and when said redox potential level is above about positive 100 mV the redox potential is maintained in the range of about positive 200 to 300 mV.

* * * * *